United States Patent [19]

Yagi et al.

[11] Patent Number: 4,656,041
[45] Date of Patent: Apr. 7, 1987

[54] PROCESS FOR PREPARING HEAT RESISTANT MILK PROTEIN HAVING GOOD PROCESSABILITY

[75] Inventors: Naoki Yagi, Suita; Kwang Y. Kim, Osaka; Tarushige Nakaji, Yao, all of Japan

[73] Assignee: Minaminihon Rakuno Kyodo Kabushiki Kaisha, Miyazaki, Japan

[21] Appl. No.: 769,738

[22] Filed: Aug. 27, 1985

[30] Foreign Application Priority Data

Sep. 5, 1984 [JP] Japan ................. 59-187186

[51] Int. Cl.$^4$ ............................................. A23J 3/02
[52] U.S. Cl. ................... 426/276; 426/574; 426/575; 426/657; 426/802
[58] Field of Search ............. 426/104, 657, 802, 276, 426/574, 575

[56] References Cited

U.S. PATENT DOCUMENTS

| | | | |
|---|---|---|---|
| 3,627,536 | 12/1971 | Arima et al. | 426/802 X |
| 3,645,746 | 2/1972 | Akinson | 426/802 X |
| 3,962,481 | 6/1976 | Kumar | 426/802 X |
| 4,125,630 | 11/1978 | Orthoefer | 426/104 |
| 4,165,392 | 8/1979 | Kawai et al. | 426/802 X |
| 4,423,083 | 12/1983 | Shenouda | 426/802 X |

*Primary Examiner*—Robert Yoncoskie
*Attorney, Agent, or Firm*—Wegner & Bretschneider

[57] ABSTRACT

A process for preparing a heat resistant milk protein having excellent processability which comprises subjecting an aqueous solution or dispersion containing casein and an acidic polysaccharide at pH of 7.5–10.5 and at a temperature of 70° C. or higher for 5 minutes or more, forming the resultant into a desired shape, and soaking in an aqueous solution containing multivalent metallic compound in an amount of 10 mM or more as a multivalent metal.

6 Claims, No Drawings

PROCESS FOR PREPARING HEAT RESISTANT MILK PROTEIN HAVING GOOD PROCESSABILITY

FIELD OF THE INVENTION

The present invention relates to a process for preparing heat resistant a milk protein having good processability. More particularly, it relates to a process for preparing a milk protein which has heat resistance enough to prevent heat softening properties of casein which is a main component of a milk protein as well as such good processability that it can be readily made into a desired shape, and hence, which is useful as a raw material for food.

BACKGROUND OF THE INVENTION

Unlike a heat curdling protein such as globulin, albumin or the like, casein which is a main component of a milk protein has heat softening properties. Due to such properties, it is extremely difficult to produce a food product such as, for example, an artificial meat product containing casein or a milk protein as a main component thereof and having a texture which can be subjected to heat cooking because its texture is liable to be spoiled by heating.

Accordingly, various methods have been heretofore proposed to modify heat softening properties of casein. For example, a method in which a milk protein is formed into fiber and boiled in a salt bath or treated with a compound having an aldehyde group to give resistance to heat softening (Schmandk et al, Die Nahrung, 20, 10, 911–914 (1976); or Japanese Patent Publication No. 26381/1981); and a method in which milk protein is formed into fiber and treated with an aqueous phosphate to give resistance to heat softening (Japanese Patent Laid Open Publication Nos. 79048/1977 and 79049/1977) have been known. However, resistance to heat softening resistance provided by these methods is not always sufficient, and in any case, a milk protein is previously fixed in a predetermined shape such as a fibrous form and then the shaped protein is treated to give resistance to heat softening. Therefore, the protein can not be finished in a desired optional shape. Further, a method which comprises treating a solution containing casein with a protease, a phosphate and a multivalent metallic compound to gel the solution and then heating the gel to give heat curdling properties has been also known (Japanese Patent Publication No. 32857/1983). However, since this method provides heat curdling properties to the protein by gelation and heating, the protein can not be finished in a desired optional shape, either.

The present inventors have intensively studied modification of heat softening properties of casein. As the result, the present inventors have found that, when an aqueous solution or dispersion containing casein and an acidic polysaccharide is heated under certain conditions and the resulting heated product is formed into a desired shape and treated with a multivalent metallic compound, the heat softening properties of casein can be readily modified and, in addition, the products can be finished in a desired optional shapes.

OBJECTS AND SUMMARY OF THE INVENTION

One object of the present invention is to provide a casein having good heat resistance.

Another object of the present invention is to provide provide a novel process for preparing a milk protein which has an excellent processability.

These objects and other objects and advantages of the present invention will become apparent to those skilled in the art from the following description.

According to the present invention, these objects can be generally attained by subjecting an aqueous solution or suspension containing casein and 0.1–20 parts by weight (the term "parts" hereinafter means "parts by weight") of an acidic polysaccharide per 100 parts of casein to a heat treatment at pH 7.5 to 10.5 and at a temperature of not less than 70° C. for 5 minutes or more, forming the resultant into a desired shape, and then soaking the shaped material in an aqueous solution containing a multivalent metallic compound in an amount of 10 mM or more as the multivalent metal. According to the present invention, heat resistance can be readily provided to casein by heating casein and an acidic polysaccharide under the above conditions and treating them with a multivalent metal. Further, the material resulted from the above heat treatment can be readily formed into a desired shape and, by soaking it in an aqueous solution containing a multivalent metallic compound to give shape retention, a milk protein can be finished in a desired optional shape such as fiber, membrane, sphere and the like.

DETAILED DESCRIPTION OF THE INVENTION

In order to carry out the process of the present invention, at first, an aqueous solution or dispersion of casein and an acidic polysaccharide is prepared.

Casein used includes casein or sodium caseinate. Casein is used by dissolving it in an alkaline solution free from a multivalent cation, for example, in an aqueous solution of an alkali such as sodium hydroxide, potassium hydroxide, aqueous ammonia, sodium carbonate, sodium triphosphate, potassium carbonate, etc. Sodium casein is used by dissolving it in warm water. The amount of casein used is 5% (% hereinafter means wt %) or more based on the entire aqueous solution or dispersion to be prepared, generally, 5–30% is preferred. When it is less than 5%, sufficient shape retention cannot be obtained in the subsequent treatment with a multivalent metal which results in difficulty in handling. The acidic polysaccharide includes alginic acid, sodium alginate, alginic acid propylene ester, carrageenin (any one of κ, λ and ι), furcellaran, etc. It can be used alone or in a combination thereof. The acidic polysaccharide is used in the ratio of 0.1–20 parts per 100 parts of casein. When this ratio of the acidic polysaccharide is either too small or too large, any desired heat resistance is not expected and, particularly, when it is too large, such a problem that viscosity is too high is resulted. The aqueous solution or dispersion can be prepared by dissolving or dispersing casein and an acidic polysaccharide simultaneously or successively in a hot water or the above aqueous alkaline solution according to a conventional manner. Alternatively, it can be prepared by separately dissolving or dispersing casein and an acidc polysaccharide in advance and then mixing them. Optionally, other ingredients, for example, a neutral saccharide such as glucose, sucrose or starch, oils and fats and the like, may be added to this aqueous solution or dispersion.

Then, the aqueous solution or dispersion thus obtained is heated at pH 7.5-10.5 and at a temperature of 70° C. or higher for 5 minutes or more. When an aqueous alkaline solution is employed to dissolve casein, adjustment of pH of the solution or dispersion is not always required. In general, however, adjustment of pH is required, and it is carried out with the above alkali free from a multivalent cation.

Although there is no intention to limit to a particular theory, it is understood that a certain reaction of casein and the acidic polysaccharide is taken place by the heat treatment to form a complex thereof, and a desired change in a configuration of casein is resulted by the subsequent treatment with a multivalent metallic compound to provide heat resistance to casein. In order to form a desired complex, pH of the heat treatment must be, as mentioned above, in the range from 7.5 to 10.5. Further, within this pH range, it is necessary to heat the solution or dispersion at a temperature of 70° C. or higher for 5 minutes or more. The upper limit of the heating temperature and the heating time are not limited to specific degrees unless they have some adverse effects on the resulting product. In general, however, heat treatment is preferably carried out at 70°-130° C. for 5-90 minutes in view of operation and economical efficiency.

Subsequently, the resultant from the heat treatment is, directly or after cooling, formed into a desired shape and soaked in an aqueous solution containing a multivalent metal.

The resultant from the heat treatment can be formed in a desired shape according to a conventional manner, for example, by extruding it from a extruder having a die or nozzle of a corresponding shape into a particular shape such as fiber, membrane, sphere and the like. It has been found that, when 0.5 part or more, preferably 1-20 parts of a polyglycerin fatty acid ester is added to the resultant of the heat treatment in this step, sticking of the processed material to an apparatus used in this step or in the subsequent step is minimized and, thereby, yield is improved. As the polyglycerin fatty acid ester, the oleate or stearate ester, wherein an average degree of polymerization of glycerin is 5 or more, is preferred.

The multivalent metallic compound includes one or more compounds selected from the group consisting of calcium chloride, calcium sulfate, calcium phosphate, calcium carbonate, calcium lactate, calcium hydroxide, magnesium chloride, magnesium sulfate, magnesium citrate, magnesium lactate and magnesium hydroxide . The multivalent metallic compound is used by dissolving it in water at the concentration of 10 mM or more as a multivalent metal, generally 70-1500 mM. As the concentration of the multivalent metal is too low, the desired heat resistance and shape retention can not be obtained.

The shaped product can be soaked in an aqueous solution containing the multivalent metallic compound according to a conventional manner. When the concentration of the multivalent metal is higher, soaking can be performed at room temperature for only a several seconds to provide sufficient heat resistance and shape retention. Even if the concentration is low, soaking room temperature for 5-30 minutes is sufficient. Further, the soaking solution may be heated, if necessary.

Thus, after soaking, the desired heat resistant milk protein of the present invention which has an excellent processability can be obtained. The milk protein of the present invention thus obtained can be used directly as it is, or, after subjecting to additional processes, to produce food such as, for example, an artificial meat product having texture which can be subjected to heat cooking, or the like.

The results of the tests for the effect of addition of the acidic polysaccharide; and the relations between processing conditions and both heat resistant properties and processability are illustrated hereinafter.

Test 1

Effect of addition of acidic polysaccharide 50 ml Portions of warm water are placed in three 200 ml beakers (A, B and C). 0.5 g of $\iota$-Carrageenin and 0.5 g of locust bean gum were added respectively to the beakers A and B, and stirred to effect solution. Nothing was added to beaker C, as a control. Separately, casein solution was prepared by dispersing 100 g of casein in 400 ml of warm water and then adding 5 ml of 28% aqueous ammonia to dissolve casein. 50 ml Portions of this casein solution were respectively added to the beakers A, B and C, and the mixtures were thoroughly stirred and then pH's thereof were adjusted to 9.0 with 1N sodium hydroxide. Then, each beaker was heated at 80° C. for 30 minutes after which each solution was added to 10% aqueous calcium chloride via a 10 ml pipette, and observed their appearance. The results were as follows:

Beaker A: A white fibrous material was obtained, which retained its shape as it was when it was taken out and heated in boiling water.

Beakers B and C: The calcium chloride solution became cloudy, but any material having a certain shape was not obtained.

As is seen from the above results, a milk protein having heat resistance and shape retention properties can be obtained by using an acidic polysaccharide.

Test 2

Effect of pH during heat treatment 5 g of $\kappa$-Carrageenin was added to 900 ml of warm water, to which was added and dissolved 100 g of sodium casein to prepare a solution containing casein and carrageenin. 100 g Portions of this solution were distributed into six beakers, and pH's were adjusted to 7.0, 7.5, 8.0, 9.0, 10.5 and 11.0, respectively, with sodrum hydroxide. Then, each beaker was heated at 80° C. for 30 minutes, and each solution was intermittently added dropwise, in spheres, to 5% aqueous calcium chloride with a truncated pipette. Then the material thus obtained was taken out, washed with water to remove an excess of calcium ion after which boiled in boiling water for 5 minutes. Change in shape of the resulting material was observed and the texture of the material was estimated. The results are shown in Table 1.

TABLE 1

| pH | Shapes of the materials after 5 min-boiling | Texture |
|---|---|---|
| 7.0 | sphere-shape was immediately deformed, dissolved, a small amount of membrane remained | could not be estimated |
| 7.5 | boiling water was slightly clouded, sphere shapes remained | soft doughy texture |
| 8.0 | no cloudiness, no changes in sphere shapes | very elastic, fish flesh sausage-like texture |
| 9.0 | no cloudiness, no changes in | very elastic, fish |

TABLE 1-continued

| pH | Shapes of the materials after 5 min-boiling | Texture |
|---|---|---|
|  | sphere shapes | flesh sausage-like texture |
| 10.5 | no cloudiness, no changes in sphere shapes, emitting sulfur odor | having a texture like heat processed white meat of chicken |
| 11.0 | membrane was formed only on the surface, solution remained at the center, strong sulfur odor | extremely hard only at the surface |

As is seen form these results, the heat treatment in the process of the present invention is carried out at pH 7.5–10.5, preferably at pH about 8.0–9.0.

Test 3

Effect of heating temperature and time 5 g of ι-Carrageenin was added and dissolved in 900 ml of warm water and to which was added 100 g of sodium caseinate to effect a solution containing casein and carrageenin. The pH of the solution was adjusted to 8.5 with sodium hydroxide and then it was divided into 50 g portions and heated at 60°, 70°, 90° and 121° C., for 3, 5, 15, 30 and 60 minutes, respectively. Each solution was injected continuously to 5% calcium chloride with a pipette to form it into string and allowed to stand for 15 minutes. After 15 minutes, the material thus formed was taken out, washed, boiled in boiling water for 5 minutes and estimated the shape and texture according to the following criteria:

x: The boiling water became cloudy and the string-like material was dissolved.

Δ: The boiling water became slightly cloudy but the string-like material retained its shape. Texture was somewhat sticky and doughy.

o: The boiling water did not become cloudy and the string-like material completely retained its shape. Texture was very elastic.

The results are shown in Table 2, wherein the heating time at 90° C. and 120° C. are those after reaching the temperatures.

TABLE 2

| Heating Temp (°C.) | Heating Time (min) | | | | |
|---|---|---|---|---|---|
|  | 3 | 5 | 15 | 30 | 60 |
| 60 | x | x | x | x | x |
| 70 | x | Δ | o | o | o |
| 90 | Δ | o | o | o | o |
| 121 | o | o | o | o | o |

As is seen from these results, it is necessary to heat at 70° C. for 5 minutes or more.

Test 4

The ratio of casein to acidic polysaccharide

To each of six 200 ml beakers were added 50 ml portions of warm water and to which was added 5 mg, 10 mg, 50 mg, 500 mg, 2 g or 2.2 g of ι-carrageenin, respectively, and heated with stirring to effect solution. Separately, a solution containing casein was prepared by adding 100 g of casein to 400 ml of warm water, adding 5 ml of 28% aqueous ammonia and stirring. 50 g Aliquots of this solution were placed in the said beakers and each was completely stirred and then adjusted pH to 8.0 with sodium hydroxide and heated at 80° C. for 15 minutes. The resulting solution was intermittently added dropwise to 10% calcium chloride with a pipette to form a sphere-shaped material. The sphere-shaped material was placed in boiling water for 5 minutes and the degree of cloudiness and texture were evaluated based on the following criteria:

Degree of cloudiness:

x: The boiling water completely became cloudy.

Δ: The boiling water became somewhat cloudy.

o: The boiling water did not become cloudy.

Texture:

x: The texture was not uniform and contained extremely hard portions and liquid portion.

Δ: Doughy texture.

o: Very elastic and like fish flesh sausage.

The results are shown in Table 3.

TABLE 3

| Amount of Carrageenin (wt % based on casein) | Degree of Cloudiness | Texture |
|---|---|---|
| 0.05 | x | Dissolved |
| 0.1 | Δ | Δ |
| 0.5 | o | o |
| 5 | o | o |
| 20 | o | o |
| 22 | Δ | x |

As is seen form the above results, 0.5–20 parts of the acidic polysaccharide per 100 parts of casein is used.

The following examples further illustrate the present invention in detail but are not to be construed to limit the scope thereof.

EXAMPLE 1

0.5 g of ι-Carrageenin was added and dissolved in 90 ml of warm water to which was added 10 g of sodium caseinate and the resulting solution was stirred to prepared a solution containing casein and carrageenin. To the solution was added 10 ml of 20% aqueous tripolyphosphoric acid to adjust pH to 8.3. The solution was heated at 80° C. for 30 minutes, which was extruded through a stainless tube having an inner diameter of 0.5 mm into 5% aqueous calcium chloride solution and soaked in the calcium chloride solution for 10 minutes. Then, the soaked product was taken out to give 80 g of the desired string-like milk protein of about 0.7 mm diameter.

The above string-like milk protein retained its shape even after it was boiled in boiling water for 30 minutes, in addition, it remained to be very elastic. And the boiling water did not become cloudy.

EXAMPLE 2

2 kg of Casein was dispersed in 8 L of warm water to which was added 100 ml of 28% aqueous ammonia to dissolve casein. Then, 100 ml of 4% aqueous sodium alginate was added to the solution and pH was adjusted to 7.7 with 30 ml of 10 N sodium hydroxide to prepare the solution containing casein and sodium alginate. The resulting solution was heated at 73° C. for 10 minutes. After heating, 20 g of polyglycerin stearate (average polymerization degree of glycerin is 7) was added and the mixture was completely stirred and extruded through slit of 0.2×50 mm into 100 ml of 10% aqueous calcium chloride to give 9.9 kg of a desired membrane-shaped milk protein of 0.2 mm thick and 55 mm wide.

After washed with water, the product was boiled in boiling water for 30 minutes, but there was no change in its shape and the boiling water did not become cloudy. The texture of the product after boiling was like sliced boiled beef.

EXAMPLE 3

23 g of Furcellaran was added to 350 g of warm water and the resulting mixture was stirred to effect solution, after which was added 150 g of sodium caseinate and dissolved to prepare a solution containing casein and furcellaran. The solution was adjusted to pH 10.0 with 5N sodium hydroxide and heated and treated in an autoclave at 121° C. for 15 minutes. Then, the product was intermittently extruded through a cylinder of 5 mm diameter to give a desired sphere-shaped milk protein of 5 mm diameter.

The product did not change its shape after boiled in boiling water for 30 minutes, and further the boiling water did not become cloudy. The texture was like white meat of chicken.

EXAMPLE 4

0.5 g of κ-Carrageenin was added to 400 g of warm water and dissolved. Then, 100 g of sodium caseinate was added to the mixture and stirred to effect solution. 170 ml of 10% Aqueous sodium polyphosphate was added to the mixture to adjust pH to 8.0 and the mixture was heated at 80° C. for 30 minutes. After heating, 100 g of hydrogenated soybean oil, 2 g of a sucrose fatty acid ester, and small amount of a yellow coloring agent and a flavor were added to the mixture which was subject to homogenization at the pressure of 150 kg/cm$^2$ and extruded from 0.2×50 mm slit into 5% aqueous calcium chloride to give 650 g of the desired membrane-shaped milk protein.

When the product was boiled in boiling water, there were no separation of the coloring agent and oil and no change in its shape. The milk protein showed an appearance and texture similar to Yuba (skin of boiled soy milk).

EXAMPLE 5

To 400 ml of warm water was added 7 ml of 28% aqueous ammonia and further slowly added a mixture of 100 g of casein and 10 g of carrageenin with stirring to effect solution to obtain a solution of pH 8.5 containing casein and carrageenin. This solution was heated at 80° C. for 30 minutes and added with 50 g of beef paste, a small amount of beef flavor and 50 g of lard dissolved by heating, and the mixture was thoroughly mixed. The mixture was placed in a refrigerator overnight to gel and cut into appropriate size and soaked in 3% aqueous calcium chloride for 30 minutes to give a desired block-shaped milk protein.

After the products were boiled in boiling water for 30 minutes, a part of oil and beef paste which were not fully emulsified were separated, but there was no other change. The texture of the products were similar to roast.

What is claimed is:

1. A process for preparing a heat resistant milk protein having excellent processability which comprises subjecting an aqueous solution or dispersion containing casein and 0.1–20 parts by weight of an acidic polysaccharide per 100 parts of casein to a heat treatment at pH of 7.5–10.5 and at a temperature of 70°–130° C. for at least 5 minutes, shaping the resultant product, and then soaking and treating the product in an aqueous solution containing a multivalent metallic compound in an amount of at least 10 mM as a multivalent metal for a time effective to impart heat resistance and shape retention.

2. A process according to claim 1, wherein the acidic polysaccharides are selected from the group consisting of alginic acid, sodium alginate, propylene alginate, carrageenin and furcellaran.

3. A process according to claim 1, wherein the multivalent metallic compound is selected from the group consisting of calcium sulfate, calcium phosphate, calcium carbonate, calcium lactate, calcium hydroxide, magnesium chloride, magnesium sulfate, magnesium citrate, magnesium lactate and magnesium hydroxide.

4. A process according to claim 1, wherein the heat treatment is carried out for 5 to 90 minutes.

5. A process according to claim 1, wherein the amount of the multivalent metallic compound is 70 to 1500 mM as a multivalent metal.

6. A process according to claim 1, wherein a polyglycerin fatty acid ester is added to the product resultant from the heat treatment in an amount of 0.5–20 parts based on 100 parts of casein.

* * * * *